United States Patent [19]
Liu

[11] 4,334,806
[45] Jun. 15, 1982

[54] CAPSULE INJECTION SYSTEM FOR A HYDRAULIC CAPSULE PIPELINING SYSTEM

[75] Inventor: Henry Liu, Columbia, Mo.

[73] Assignee: The Curators of the University of Missouri, Columbia, Mo.

[21] Appl. No.: 144,414

[22] Filed: Apr. 28, 1980

[51] Int. Cl.³ .............................................. B65G 51/30
[52] U.S. Cl. ..................................... 406/31; 406/147
[58] Field of Search ................. 406/29, 31, 105, 110, 406/117, 147, 148, 149, 150; 221/278

[56] References Cited

U.S. PATENT DOCUMENTS

| | | | |
|---|---|---|---|
| 393,584 | 11/1888 | Robinson | 406/110 X |
| 3,328,089 | 6/1967 | Hodgson et al. | 406/197 |
| 3,556,603 | 1/1971 | Liebenberg | 406/105 |
| 4,000,927 | 1/1977 | Sakamoto et al. | 406/31 |

*Primary Examiner*—Jeffrey V. Nase
*Attorney, Agent, or Firm*—Senniger, Powers, Leavitt and Roedel

[57] ABSTRACT

An injection system for injecting capsules into a hydraulic capsule pipelining system, the pipelining system comprising a pipeline adapted for flow of a carrier liquid therethrough, and capsules adapted to be transported through the pipeline by the carrier liquid flowing through the pipeline. The injection system comprises a reservoir of carrier liquid, the pipeline extending within the reservoir and extending downstream out of the reservoir, and a magazine in the reservoir for holding capsules in a series, one above another, for injection into the pipeline in the reservoir. The magazine has a lower end in communication with the pipeline in the reservoir for delivery of capsules from the magazine into the pipeline.

7 Claims, 4 Drawing Figures

CAPSULE INJECTION SYSTEM FOR A HYDRAULIC CAPSULE PIPELINING SYSTEM

BACKGROUND OF THE INVENTION

This invention relates to a hydraulic capsule pipelining system, and more particularly to an injection system for injecting capsules into a hydraulic capsule pipelining system.

Reference may be made to such U.S. Pat. Nos. as 3,325,222, 3,328,089, 3,333,901, 3,339,984, 3,556,604 and 3,633,976 disclosing hydraulic capsule pipelining (HCP) systems in which the flow of a carrier liquid through a pipeline is used to propel capsules, and in particular cargo-carrying containers, through the pipeline.

A problem with hydraulic capsule pipelining systems, which has hindered greater commercial use of such systems as a mode of cargo transport, has been the lack of a satisfactory capsule injection system for injecting the capsules, which are large and relatively heavy when loaded with cargo, into the pipeline. Among various capsule injection systems that have been proposed are injection systems of the "lock" type having a reservoir of carrier liquid, and a pipeline downstream from the reservoir having a series of valves, suction means, and a pump operable for drawing carrier liquid and the capsules into the pipeline from the reservoir and for pumping the carrier liquid through the pipeline to propel the capsules. The structure of this capsule injection system is relatively complex and its operation involves a complicated sequence of valve openings and closings and pumping operations which can generate destructive pressure surges in the pipeline (i.e., water hammer).

Another type of capsule injection system is the "multi-barrel revolver" type comprising a cylinder received in a space between axially aligned sections of the pipeline, the pipeline thus extending upstream and downstream of the cylinder. The cylinder has a series of chambers or bores arranged in a circular series around the longitudinal axis of the cylinder, each chamber being adapted to receive a capsule from a capsule feeding means. The cylinder is rotatably mounted so that upon rotation of the cylinder each chamber may be brought into alignment with the pipeline for enabling the flow of carrier liquid from the upstream pipeline section through the chamber to propel the capsule along the pipeline. One problem with this capsule injection system is the leakage of carrier liquid at the juncture between the cylinder and the pipeline. Another is the difficulty of accurately controlling the angular position of the cylinder which is relatively large and bulky.

Other proposed capsule injection systems include the "rotary-vane pump" system having a large pump rotor adapted to receive capsules between adjacent pump vanes and a housing opening into the pipeline, and the "multi-tube launcher" system having a reservoir, and series of open-ended launching tubes on a conveyor belt in the reservoir, the tubes being movable past an inlet to the pipeline. A source of carrier liquid under pressure is provided for directing carrier liquid at the upstream end of the capsules to move the capsules in the launcher tubes along the tubes into the pipeline. Both of these systems, however, are relatively large and expensive.

SUMMARY OF THE INVENTION

Among the several objects of this invention may be noted the provision of an improved capsule injection system for a hydraulic capsule pipelining system; the provision of such a capsule injection system for injecting capsules into a pipeline at an entrance end section or at an intermediate section of the pipeline; the provision of such a capsule injection system which is of relatively economical and compact construction; the provision of such a capsule injection system which injects capsules into the pipeline without generating pressure surges in the pipeline; and the provision of such a capsule injection system capable of injecting capsules into a pipeline in a simple, reliable manner, free of jamming in the capsule injection system or the pipeline.

In general, a capsule injection system of this invention comprises a reservoir of carrier liquid, the pipeline of the hydraulic capsule pipelining system extending within the reservoir below the level of the carrier liquid in the reservoir and extending downstream out of the reservoir, and a magazine in the reservoir for holding capsules in a series, one above another, for injection into the pipeline in the reservoir. The magazine has a lower end in communication with the pipeline in the reservoir for delivery of capsules from the magazine into the pipeline.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
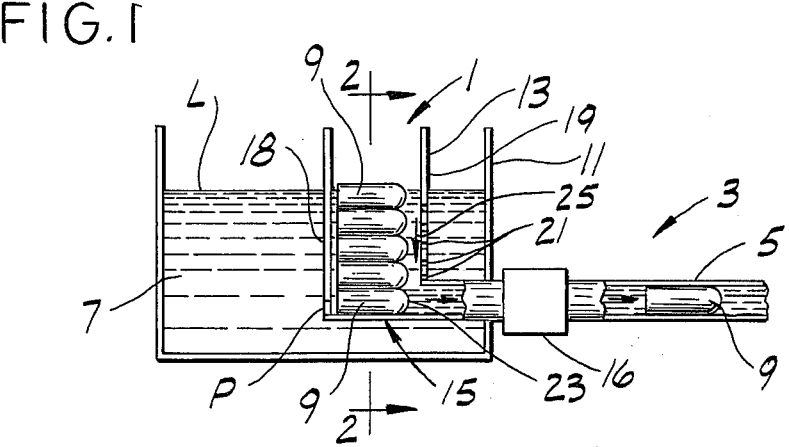
FIG. 1 is a schematic of a capsule injection system of this invention showing an entrance end section of the pipeline of a hydraulic capsule pipelining system.

Referring to FIG. 1 of the drawings, there is generally indicated at 1 a capsule injection system for a hydraulic capsule pipelining system generally indicated at 3 comprising a pipeline 5 adapted for flow of a carrier liquid 7 (e.g., water) therethrough, and capsules 9 adapted to be transported through the pipeline by the carrier liquid flowing through the pipeline. The capsule injection system 1 comprises a reservoir 11 of carrier liquid and a magazine 13 in the reservoir for holding capsules in a series, one above another, for injection into the pipeline. The pipeline as shown in FIG. 1 has an entrance end section generally indicated at 15 extending within the reservoir below the level L of the carrier liquid in the reservoir, and means, such as the pumping means 16 disclosed in applicant's co-pending U.S. patent application Ser. No. 51,493, operable for drawing carrier liquid from the reservoir and pumping it through the pipeline. The pipeline 5 extends downstream of the reservoir 11 with the pumping means 16 on the downstream portion of the pipeline. The magazine 13 holds the capsules, which are generally cylindrical, with their longitudinal axes generally parallel to the axis of the pipeline, and has a lower end in communication with the entrance end section 15 of the pipeline for delivery of the capsules from the magazine into the pipeline with their axes lined up with the pipeline. The entrance end section 15 of the pipeline is in communication with the reservoir through a passage P for flow of carrier liquid 7 from the reservoir 11 into and through the entrance end section for transporting a capsule delivered from the magazine 13 into the entrance end section through and downstream away from the entrance end section.

In accordance with this invention, the magazine 13 has side walls 17 spaced apart a distance somewhat greater than the diameter of the capsules 9, and upstream and downstream end walls 18, 19 spaced apart a distance somewhat greater than the capsule length so that the capsules may descend through the magazine toward its lower end where the lowermost capsule is delivered to the entrance end section 15 of the pipeline. To prevent jamming of the lowermost capsule at the entrance end section 15 of the pipeline upon descending into the pipeline, the downstream end wall 19 of the magazine 13 is apertured as generally indicated at 21 and the side and upstream end walls are substantially free of openings therein for directing the flow of carrier liquid entering the magazine from the reservoir down past the downstream end 23 (i.e., the nose) of the capsule, thereby providing means for effecting tilting of the lowermost capsule down toward its downstream end as it descends into the pipeline. Suction created by the pump means 16 draws the carrier liquid 7 through the apertures in the downstream end wall 19 of the magazine toward the pipeline, the carrier liquid flowing in a path generally indicated at 25 in FIG. 1.

Figure 2:
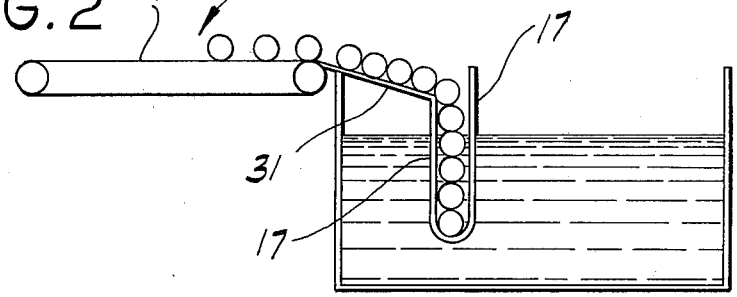
FIG. 2 is a vertical section on line 2—2 of FIG. 1 showing means for feeding capsules into the open upper end of the magazine of the injection system.

As shown in FIG. 2, the magazine 13 extends up above the level L of the carrier liquid 7 in the reservoir 11 and has an open upper end or inlet above the level of the carrier liquid for receiving capsules 9. Means generally indicated at 27 is provided for loading the capsules into the magazine comprising a conveyor 29 upon which are carried a series of capsules and a chute 31 between the conveyor and the inlet of the magazine over which the capsules can roll toward the magazine. Preferably, a guide railing (not shown) is provided at the sides of the conveyor and the chute for maintaining alignment of the capsules with the inlet of the magazine.

In the operation of the capsule injection system 1, the magazine receives a series of capsules 9 from the loading means 27, the capsules received descending in the magazine through the carrier liquid 7 until the lowermost capsule engages and bears on the bottom of the entrance end section 15 of the pipeline 5 and each of the remaining capsules of the series engages and bears on the capsule beneath it. In many instances, the weight of a loaded capsule is only slightly greater than the buoyant force on the capsule when immersed in the carrier liquid so that the vertical load applied on the lowermost capsule by the capsules above it is relatively small. Upon operation of the pumping means 16, carrier liquid 7 is drawn into the entrance end section 15 past the capsule delivered to the pipeline thereby developing a horizontal force on the capsule tending to move the capsule along the pipeline. Upon increasing the suction of the pumping means, the horizontal force on the capsule in the pipeline reaches a magnitude at which the capsule moves out from beneath the capsules bearing down on it and through the pipeline toward the pump means 16. The remainder of the capsules then descend in the magazine 13 for delivery of the next capsule into the entrance end section 15 of the pipeline, the lowermost capsule being tilted down toward its downstream end 23 as it descends. It is contemplated that the entrance end section 15 of the pipeline may be inclined downwardly toward the pump means 16, or the capsule injection system 1 may be provided with other means (not shown), such as a conveyor at the bottom of the entrance end section 15 or a source of carrier liquid under pressure directing carrier liquid at the upstream end of the capsule, to assist the pump means 16 in moving the capsule in the pipeline beneath the remainder of the capsules 9 toward the pumping means. If the pumping means 16 is of the type, such as that disclosed in applicant's co-pending U.S. patent application Ser. No. 51,493, requiring the passage of a capsule therethrough to develop suction upstream of the pumping means, the means for assisting the pumping means may be used to move an initial capsule to the pumping means 16 for initiation of capsule injection operations, the suction developed by the pumping means upon passage of the initial capsule therethrough moving the remainder of the capsules to be injected through the pipeline.

Figure 3:
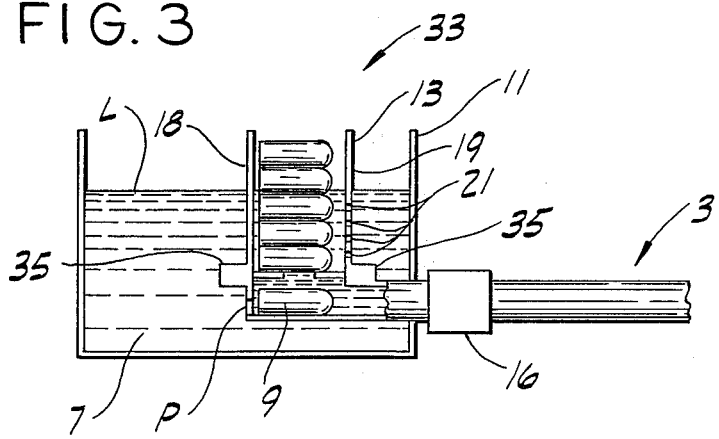
FIG. 3 is a schematic of an alternative embodiment of the capsule injection system of this invention.

An alternative embodiment of the capsule injection system, generally indicated at 33, is shown in FIG. 3. It is similar to the capsule injection system 1, except that it further includes means 35 at the lower end of the magazine for releasably holding the capsules up in the magazine, the release means being operable to release the lowermost capsule of the series to descend into the pipeline and to allow the remainder of the series to descend into position for subsequent release of the next capsule. Preferably, the capsule release means 35 comprises a pair of supports mounted for endwise movement through openings in the end walls 18, 19 of the magazine 13 between an extended position in which the supports extend into the lower end of the magazine for supporting the capsules and a retracted position in which the supports are spaced outwardly from the ends of the capsules to release the lowermost capsule. A pair of solenoids (not shown) is provided for moving the supports from extended to retracted position upon being actuated. It is contemplated that the release means may alternatively comprises a series of electromagnets mounted on the magazine end walls 18, 19 adapted when energized to hold the capsules which are usually of metal (i.e., steel) construction suspended in the magazine. Upon delivery of the lowermost capsule 9 to the pipeline 5, the release means supports the remaining capsules of the series above the lowermost capsule, so that the horizontal force required to move the capsule through the entrance end section 15 toward the pump means 16 is less than that required in the capsule injection system 1 in which the remaining capsules are allowed to bear down on the lowermost capsule.

The operation of the capsule injection system 33 is generally similar to the above-described operation of the capsule injection system 1 with the exception that the delivery of the lowermost capsule 9 of the series to the pipeline occurs upon actuation of the release means 35.

Figure 4:
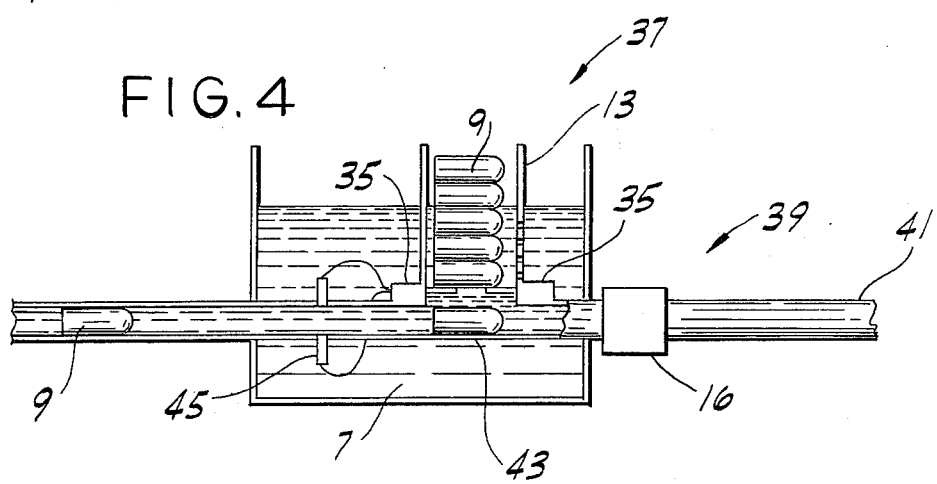
FIG. 4 is a schematic of another alternative embodiment of the capsule injection system showing an intermediate section of the pipeline of a hydraulic capsule pipelining system.

Another embodiment of the capsule injection system of this invention, generally indicated at 37, is shown in FIG. 4, the system 37 being adapted for a hydraulic capsule pipelining system 39 having a pipeline 41 extending through the reservoir of the capsule injection system. The capsule injection system 37 is similar to the capsule injection system 33 shown in FIG. 3 except that the lower end of the magazine 13 is in communication with an intermediate section 43 of the pipeline in the reservoir, and that it further includes means for deactivating the capsule release means 35 in response to the presence of a capsule in the pipeline 41 upstream from the magazine. The deactivating means comprises a capsule sensor 45, such as a photo-electric sensor or an inductive sensor, carried on the pipeline 41 upstream of the magazine 13 operable to prevent the release of the lowermost capsule of the series when a capsule is approaching the magazine in the pipeline 41. With the release means 35 enabled for actuation, the operation of the capsule injection system 37 is generally similar to the above-described operation of the capsule injection system 33.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An injection system for injecting generally cylindrical capsules into a hydraulic capsule pipelining system, said pipelining system comprising a pipeline adapted for flow of a carrier liquid therethrough and capsules adapted to be transported through the pipeline by the carrier liquid flowing therethrough, said injection system comprising a reservoir of carrier liquid, the pipeline extending within the reservoir below the level of the carrier liquid in the reservoir and extending downstream out of the reservoir, and a magazine in the reservoir for holding capsules in a series, one above another, for injection into the pipeline in the reservoir, said magazine having a lower end in communication with the pipeline in the reservoir for delivery of capsules from the magazine into the pipeline, the magazine being arranged to hold the capsules with the lowermost capsule in the magazine having its longitudinal axis generally parallel to the axis of the pipeline for entry of the lowermost capsule into the pipeline lined up with the pipeline for being transported away from the lower end of the magazine by the carrier liquid, the magazine having side walls spaced apart a distance somewhat greater than the capsule diameter and upstream and downstream end walls spaced apart a distance somewhat greater than the capsule length, the downstream end wall being apertured and the side and upstream end walls being substantially free of openings therein for directing the flow of carrier liquid entering the magazine from the reservoir down along the downstream end wall to effect tilting of the lowermost capsule down toward its downstream end as it enters the pipeline.

2. An injection system for injecting elongate, generally cylindrical capsules into a hydraulic capsule pipelining system, said pipelining system comprising a pipeline adapted for flow of a carrier liquid therethrough and capsules adapted to be transported through the pipeline by the carrier liquid flowing therethrough, said injection system comprising a reservoir of carrier liquid, the pipeline extending within the reservoir below the level of the carrier liquid in the reservoir and extending completely through the reservoir, a magazine in the reservoir for holding capsules in a series, one above another, for injection into the pipeline in the reservoir, said magazine having a lower end in communication with an intermediate section of the pipeline in the reservoir for delivery of capsules from the magazine into the pipeline, the magazine being arranged to hold the capsules with the lowermost capsule in the magazine having its longitudinal axis generally parallel to the axis of the pipeline for entry of the lowermost capsule into the pipeline lined up with the pipeline for being transported away from the lower end of the magazine by the carrier liquid, the magazine having side walls spaced apart a distance somewhat greater than the capsule diameter and corresponding generally to the pipeline diameter and upstream and downstream end walls spaced along the pipeline a distance somewhat greater than the capsule length, means at the lower end of the magazine for releasably holding the capsules up in the magazine, said means being operable to release the lowermost capsule to descend into the pipeline and to allow the remainder of the series to descend into position for subsequent release of the next capsule, and having means for deactivating said capsule release means in response to the presence of a capsule in the pipeline upstream from its said intermediate section.

3. An injection system as set forth in claim 2 wherein said deactivating means comprises capsule sensor means upstream from said intermediate section of the pipeline.

4. An injection system as set forth in claim 3 having means for effecting tilting of the lowermost capsule down toward its downstream end as it descends into the pipeline.

5. An injection system as set forth in claim 4 wherein said tilting means comprises apertures in the downstream end wall of the magazine for entry of carrier liquid to effect the said tilting.

6. An injection system for injecting capsules into a hydraulic capsule pipelining system, said pipelining system comprising a pipeline adapted for flow of a carrier liquid therethrough and capsules adapted to be transported through the pipeline by the carrier liquid flowing therethrough, said injection system comprising a reservoir of carrier liquid, the pipeline extending through the reservoir below the level of the carrier liquid in the reservoir and extending downstream out of the reservoir, a magazine in the reservoir for holding capsules in a series, one above another, for injection into the pipeline in the reservoir, said magazine having a lower end in communication with an intermediate section of the pipeline in the reservoir for delivery of capsules from the magazine into the pipeline, and means at the lower end of the magazine for releasably holding the capsules up in the magazine, said means being operable to release the lowermost capsule to descend into the pipeline and to allow the remainder of the series to descend into position for subsequent release of the next capsule, and means for deactivating said capsule release means in response to the presence of a capsule in the pipeline upstream from its said intermediate section.

7. An injection system as set forth in claim 6 wherein said deactivating means comprises capsule sensor means upstream from said intermediate section of the pipeline.

* * * * *